F. R. STEHM.
APPARATUS FOR MAKING ARTIFICIAL STONE.
APPLICATION FILED MAY 14, 1906. RENEWED MAY 6, 1914.

1,101,578.

Patented June 30, 1914.
5 SHEETS—SHEET 2.

UNITED STATES PATENT OFFICE.

FRANK R. STEHM, OF DES MOINES, IOWA, ASSIGNOR, BY DIRECT AND MESNE ASSIGNMENTS, TO THE ENAMEL CONCRETE AND MACHINERY COMPANY, OF DES MOINES, IOWA, A CORPORATION OF SOUTH DAKOTA.

APPARATUS FOR MAKING ARTIFICIAL STONE.

1,101,578.   Specification of Letters Patent.   Patented June 30, 1914.

Application filed May 14, 1906, Serial No. 316,893. Renewed May 6, 1914. Serial No. 836,808.

*To all whom it may concern:*

Be it known that I, FRANK R. STEHM, a citizen of the United States, residing at Des Moines, in the county of Polk and State of Iowa, have invented a certain new and useful Apparatus for Making Artificial Stone, of which the following is a specification.

The object of my invention is to provide an apparatus of simple and durable construction for manufacturing artificial stones quickly and easily and in large numbers, which stones when finished will have one or more surfaces smooth and glossy and the corners adjacent to said surfaces smooth and slightly rounded and said surfaces hard and highly impervious to moisture.

My invention consists in the construction, arrangement and combination of the various parts of the device, whereby the objects contemplated are retained, as hereinafter more fully set forth, pointed out in my claims and illustrated in the accompanying drawings, in which—

Figure 1:
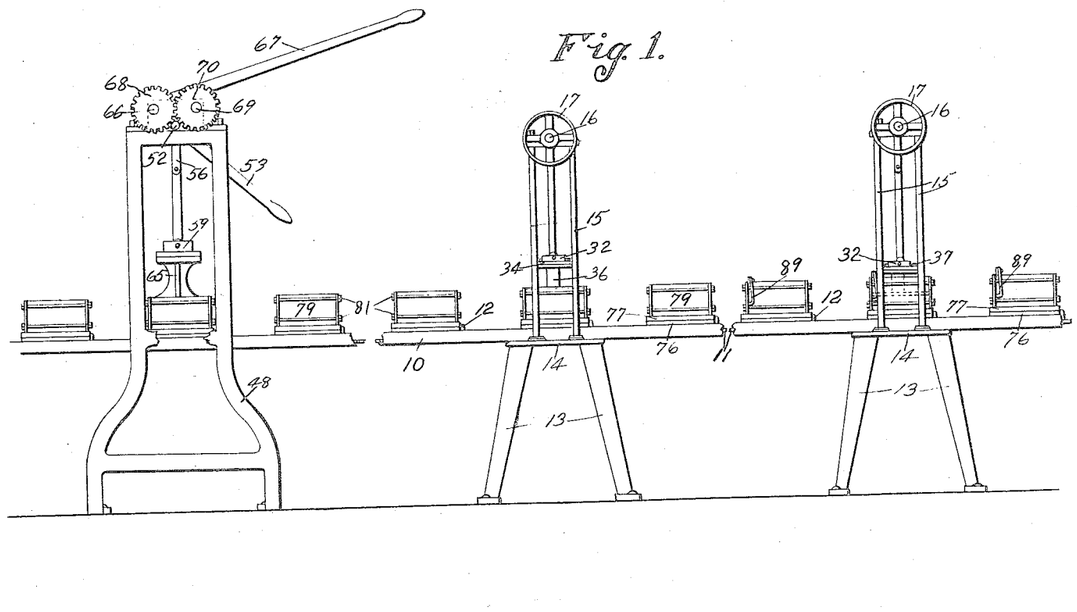
Figure 1 shows a side elevation of the complete apparatus to illustrate the general arrangement of the several parts thereof.

Referring to Fig. 1 of the drawings, the apparatus is seen to be composed of three independent pressing devices arranged in line and connected by a conveyer, which conveyer comprises two angle bars 10 with a sprocket chain 11 traveling upon each end, provided with uprights 12 projecting above the angle bars. These angle bars extend through all of the pressing devices and beyond the first and last pressing device of the apparatus. Any suitable means may be provided for advancing the chains of the conveyer.

Figure 2:
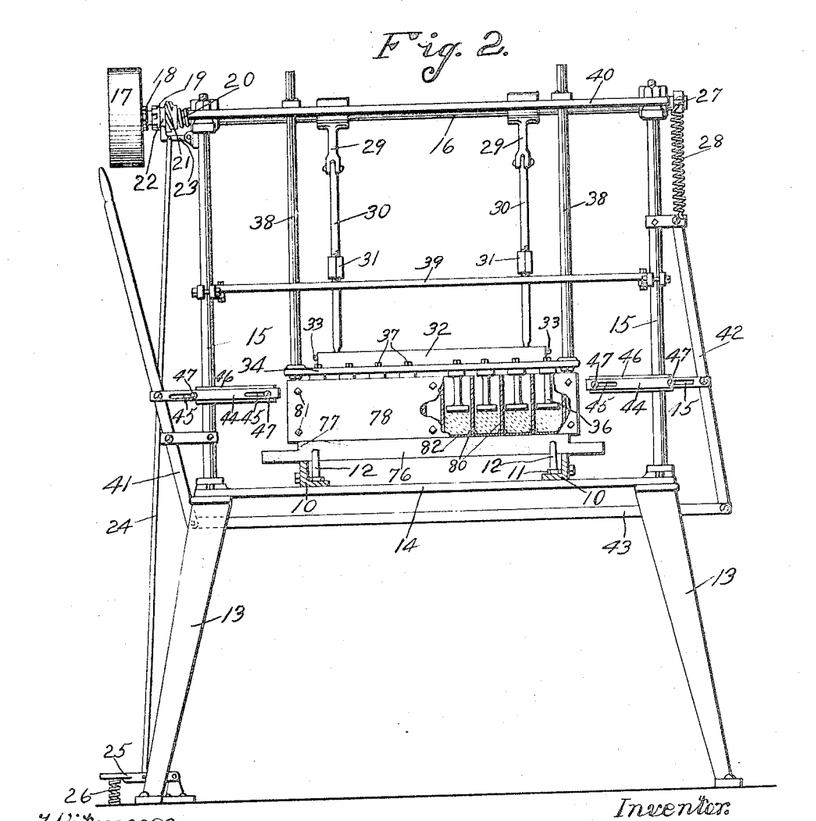
Fig. 2 shows a side elevation of the first compressing device with a mold in position thereon, parts of which are broken away to show the presser plates within the mold.
Figure 3:
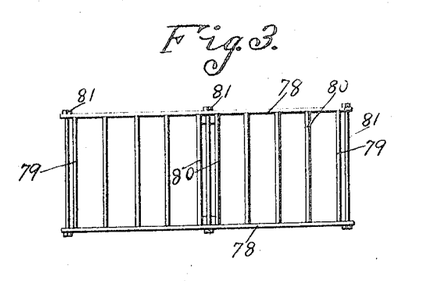
Fig. 3 shows a top view of one of the molds.
Figures 4, 5, 6, 7, 8, 9:
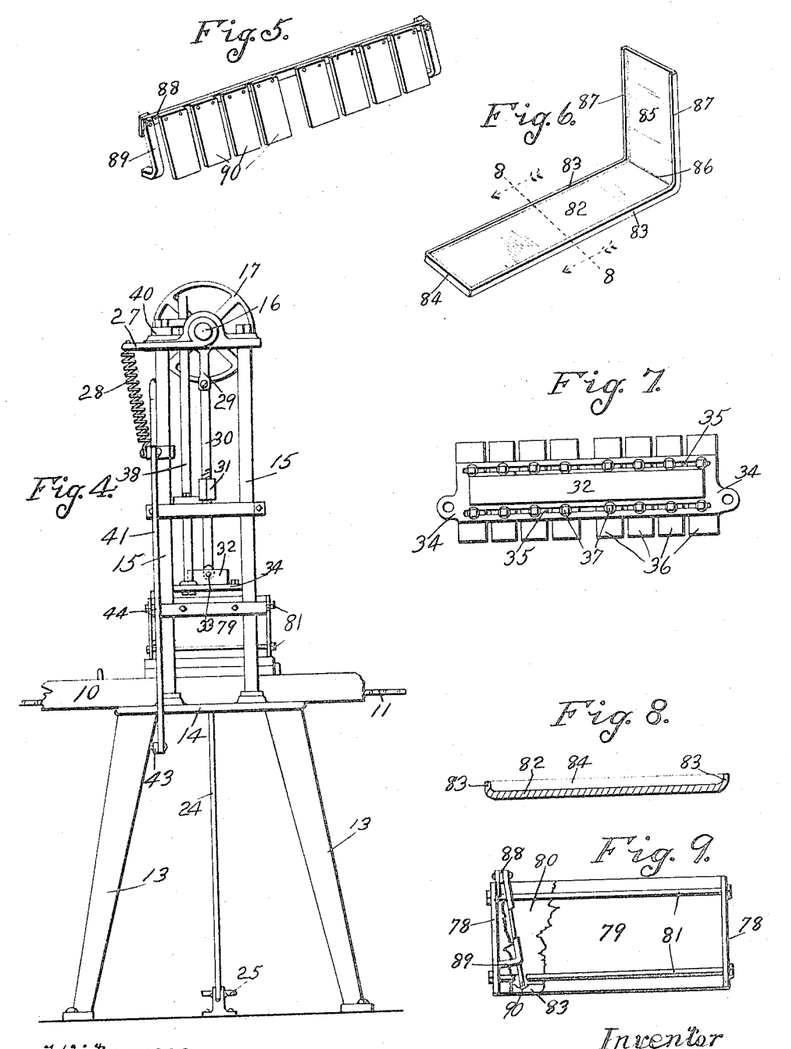
Fig. 4 shows an end elevation of the presser device shown in Fig. 1.
Fig. 5 shows a detail, perspective view of the removable partitions for the mold and the device for connecting and supporting them.
Fig. 6 shows a detail, perspective view of one of the surfacing plates.
Fig. 7 shows a top or plan view of the presser plates of the first pressing device, to illustrate the means for adjustably connecting and supporting them.
Fig. 8 shows a sectional view on the line 8—8 of Fig. 6.
Fig. 9 shows an end elevation, partly in section, of one of the molds with the detachable partition therein.

The first pressing device, which is illustrated in Figs. 2 and 4, comprises a supporting frame 13 having a top 14 on which the angle bars 10 are mounted. Erected above the top 14 is a supplemental frame 15 having at its top the rock shaft 16. On one end of this rock shaft 16 is a pulley 17 formed with a clutch member 18, said pulley being rotatably mounted on the shaft. Adjacent to the clutch member 18 is a mating clutch member 19, slidingly and non-rotatably mounted on the shaft and normally held, by a spring 20, in engagement with the clutch member 18. Formed on the central portion of the clutch member 19 is a number of spirally arranged ribs 21 and an annular groove 22. Fulcrumed to the auxiliary frame 15 is a lever 23, beneath said clutch, this lever is provided with a projecting end designed to enter the annular groove 22 or to engage the spiral ribs 21, said lever is controlled by a rod 24 pivoted to it and to a foot treadle 25, which is normally elevated by a spring 26. In use with this portion of the device, the pulley 17 is normally rotated and the shaft 16 is stationary. By depressing the treadle 25, the operator withdraws the lever 23 from the clutch member 19 and the spring 20 forces the clutch members into engagement. Then the operator removes his foot from the treadle and the lever 23 is elevated so that its end strikes one of the spiral ribs 21 and in this way forces the clutch member away from the clutch member 18 until the lever 23 enters the annular groove 22 and then the clutch members are held separated. On the other end of shaft 16 is a crank arm 27 to which a contractible coil spring 28 is fixed to normally hold said rock shaft 16 at a certain limit of its movement whenever the clutch members 18 and 19 are released. Fixed to the shaft 16 on opposite sides of its center are two crank arms 29, each having pivoted at its lower end a rod 30. These rods 30 are made adjustable as to length by means of the adjusting nuts 31 and their lower ends are pivoted to the cross piece 32 of the presser plates, hereinafter described, by the pins 33. This cross piece 32 is provided with lugs 34 at its sides and with the longitudinal slots 35 near its edges. A number of presser plates 36 are connected with this cross piece 32 by means of bolts 37 passed through the slots 35 and into the presser plates. In this way the plates may be adjustably secured to the cross bar 32. I have provided for guiding the cross bar 32 in its up and down movement as follows: Two guide bars 38 have their lower ends passed through the lugs 34 and their central portions passed through a cross piece 39 supported by the frame 15 and their tops passed through the cross piece 40 supported by the frame 15. By this arrangement, it is obvious that, when the shaft 16 is rocked in one direction, all of the presser plates will be jointly moved downwardly and when the rock shaft is returned to its normal position by its spring, the presser plates will be jointly elevated.

I have also provided means for accurately centering a mold with relation to the presser plates as follows: Fulcrumed to one side of the frame 15 is a lever 41 and fulcrumed to the opposite side of the frame is a lever 42 which levers are pivotally connected by a link 43. Pivoted to each of said levers is a centering bar 44 formed with slots 45, each of said bars is mounted in a guide 46 and the pins 47 are fixed to said guide and passed through the slots 45. By this arrangement, the operator may grasp the lever 41 and move its top inwardly toward the frame 15, whereupon both of the centering bars 44 will be moved inwardly to engage a mold and center it accurately beneath the presser plates.

The second pressing device of the apparatus is constructed substantially like the one just described and is provided for the purpose of permitting an operator to partially fill the mold cavities of one mold during the same time that another operator is performing the same operation for the first pressing device, as will hereinafter more fully appear.

Figure 10:
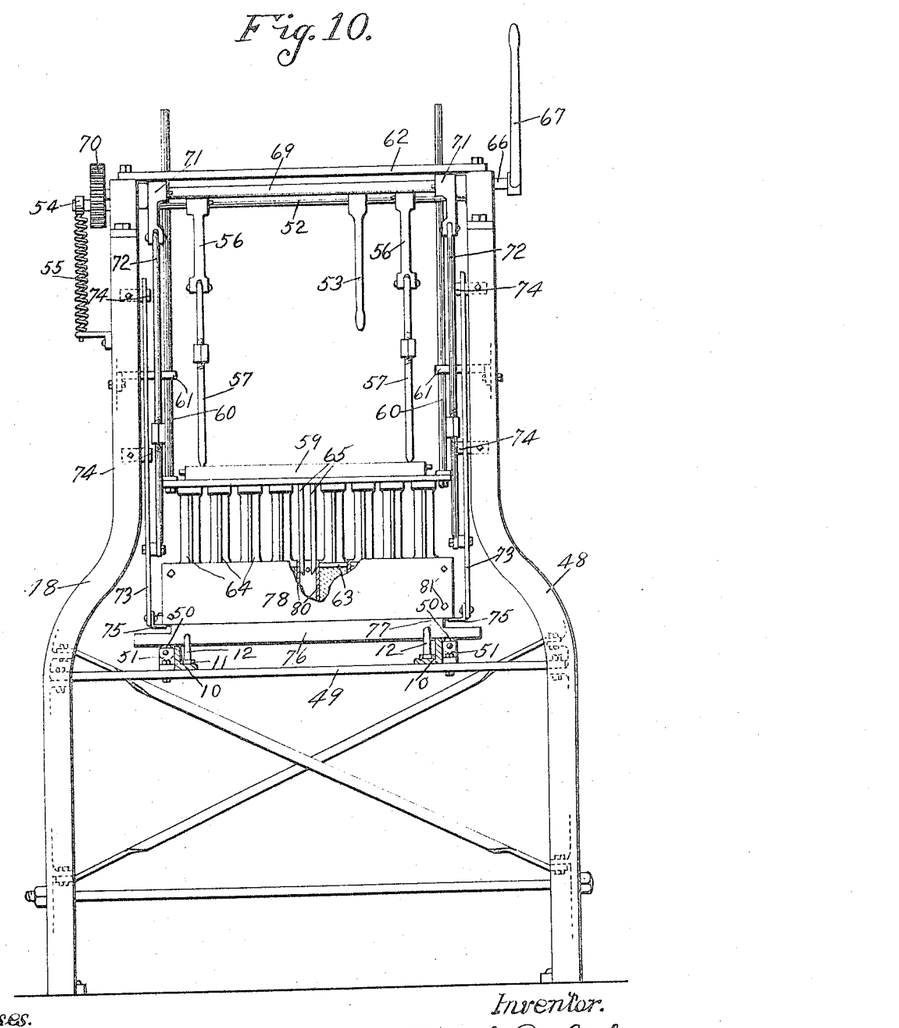
Fig. 10 shows a side view of the final pressing device of the apparatus with a mold therein having a part broken away to show the presser plates and the guides within the mold.
Figure 11:
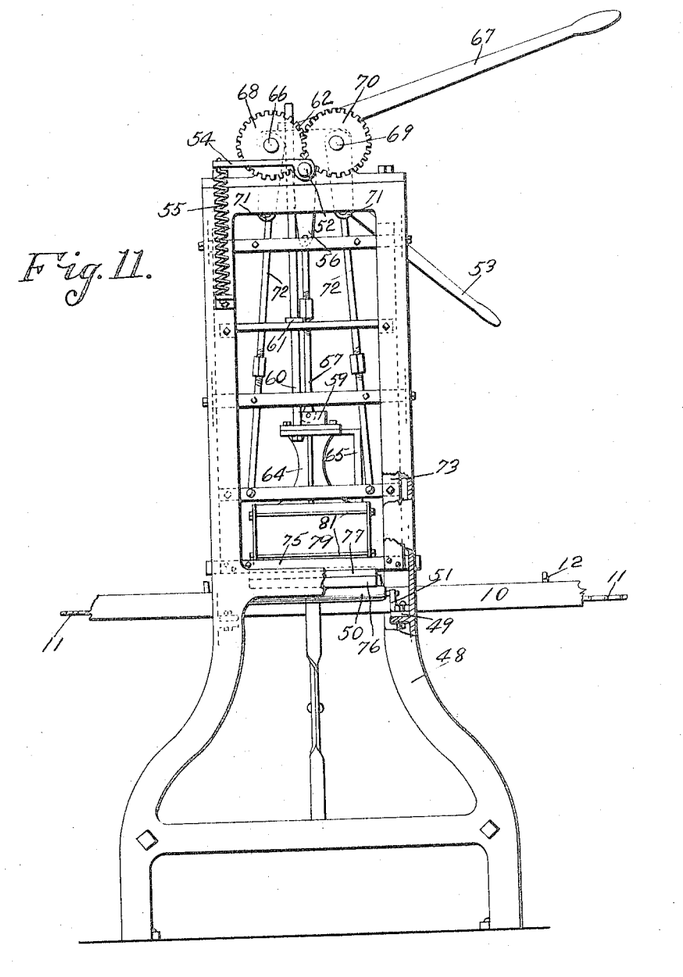
Fig. 11 shows an edge view of the same device with parts broken away to show certain details of construction.

After the molds have passed through the second pressing device, it is desirable to remove the molds from the finished artificial stone. The device that I have provided for this purpose is illustrated in Figs. 10 and 11 and comprises a main frame 48 having a cross piece 49 upon which the angle bars 10 of the conveyer are supported. Adjacent to the outer face of each of said angle bars is a roller 50 supported in the brackets 51 and arranged parallel with the angle bars with their tops slightly above the angle bars. Mounted in the top of the frame 48 is a rock shaft 52 having a lever 53 fixed thereto by which the shaft may be manually rocked, and on one end of the shaft is a crank arm 54 to which a contractible coil spring 55 is attached, the other end of the spring being connected with the frame, said spring normally holding the shaft 52 in position with the lever 53 elevated. Fixed to said shaft 52 are two crank arms 56 to which the rods 57 are pivoted. The lower ends of these rods 57 are pivoted to the cross piece 59 of the presser plates. Means are provided for guiding this cross piece and the presser plates in a straight line vertically as follows: Fixed to the ends of the cross piece 59 are the guide rods 60 passed through the guide brackets 61 and the top plate 62. Attached to the cross piece 59 is a series of presser plates 63 having comparatively long uprights 64, which are attached to the cross piece 59. At the center of the cross piece 59 are two guide bars 65 with their lower ends beveled downwardly and toward each other, said guide bars being designed to enter an opening provided for them in each mold for the purpose of centering the mold accurately under the presser plates. The rollers 50, previously referred to, are for the purpose of permitting the mold to move longitudinally in a direction transversely of the frame 48 so that this centering of the molds may be easily accomplished by said centering bars. The lower ends of said centering bars project below the presser plates so that they alone first strike the molds when the presser plates descend.

I have provided means for elevating the molds while the presser plates still remain in contact with the material in the molds as follows: Mounted near the top of the frame 48 is a rock shaft 66 having attached at one end a hand lever 67 and to the other end a pinion 68. Adjacent to the shaft 66 is a similar shaft 69 provided with a pinion 70 in mesh with the pinion 68. Fixed to each shaft 66 and 69 are two crank arms 71, each of which has connected to it a rod 72. Each bar of the rods 72 is connected to a vertically slidable frame 73 mounted in the guides 74 and at the lower end of each side of the frame 73 is an angle bar 75 arranged with its lower portion projected inwardly under a mold in the frame 48, as will hereinafter more fully appear. In use with this portion of the device and assuming a mold to be in a position with the angle bars 75 under the edges thereof and the presser plates elevated, then the operator first manipulates the lever 53, which forces the presser plates downwardly into engagement with the material in the mold cavities. This holds said material firmly against the off-bearing plate upon which the mold rests, then the operator manipulates the lever 67, which elevates the mold to a point above the material resting on the off-bearing plate and finally the lever 53 is released and the spring 55 elevates the presser plates so that the off-bearing plate containing the artificial stones may be moved away from the frame 48 by the conveyer.

For each mold, I have provided an off-bearing plate 76 having a raised central portion 77, said plate being of a width to extend over the tops of the two angle bars 10 and designed to be engaged by the uprights 12 on the conveyer chains 11. Each mold comprises two side pieces 78 and two end pieces 79 and a number of transverse partitions 80, the parts being held together by bolts 81. The two central partitions 80 are designed to coact with the guide bars 65 for the purpose of centering the mold beneath the presser plates of the last device for pressing the material in the mold and for removing the mold from the material. The length of the side pieces 78 of each mold is such that the ends will project beyond the raised central portion of the off-bearing plate and where they may be engaged by the angle bars 75. For each mold cavity of the mold, I have provided a surfacing plate, preferably made of a single piece of thin spring metal and comprising a bottom 82 with upturned side margins 83 and an upturned end margin 84. At the opposite end of the plate is an end piece 85 formed integral with the bottom piece and having a smooth, slightly rounded corner at 86. The side margins of the part 85 are inclined inwardly at 87. The inner face of this surfacing plate is formed smooth, non-erosive, moisture-repellent and non-adhesive. This may be done by providing it with a coating of japan, thoroughly baked or in any other suitable way. Said surfacing plates are of such size that they may be placed in the mold cavities with their margins flush with the inner walls of the mold cavities.

I have also provided detachable partitions for the mold cavities as follows: 88 indicates a cross piece having the arms 89 fixed to its ends and a series of thin spring metal partitions 90 fixed to it. In use the cross piece is placed on top of the mold and the arms 89 are placed against the projecting ends of the adjacent side plate 78 of the mold, thus causing the partitions 90 to stand adjacent to the inner face of the mold cavity in which the end 85 of the surfacing plate is located with the bottoms of said partitions slightly spaced apart from the bottom of the surfacing plate, said partitions normally standing with their tops nearer the end 85 than their lower ends.

In practical operation, an off-bearing plate is placed upon the angle bars of the conveyer and a mold placed thereon. Then a surfacing plate is placed in each mold cavity with the bottom of the surfacing plate forming the bottom of the mold and resting on the off-bearing plate. I then place upon each mold a cross piece containing partitions for each mold cavity. I then place in each surfacing plate a small quantity of cement so diluted with liquid that it will readily flow over the surface of the surfacing plate. The quantity of material first placed upon the surfacing plates is such that it will be contained wholly within the upturned margins of said surfacing plates and, therefore, will not overflow upon the off-bearing plate. I then place in each mold cavity a quantity of stone making material in moist condition. This material may be composed of cement and sand with enough water added to moisten it and yet not enough to thoroughly saturate it. By placing this material on top of the material in liquid form first inserted, the material in liquid form is forced by the weight of the other material upwardly between the space formed by the partitions and the upturned ends of the surfacing plates. The partitions prevent any of the material from entering on the top of the space between the partition and the end of the finishing plate. Then the conveyer is advanced until the mold is directly under the first pressing device. Then the operator presses upon the treadle 25, which sets the machinery in motion for forcing the presser plates downwardly into the mold cavity and firmly compresses the material therein. This pressure will cause part of the liquid surfacing material to flow into and fill the spaces between the partitions and the ends of the surfacing plates, and it will also force out the air from between the surfacing plates and the material, so that a smooth unbroken contact will be had. During the time that the presser plates are moving downwardly in the mold cavities, they will engage the partitions and cause the lower ends thereof to spring toward the ends of the surfacing plates and this movement will also aid in forcing the liquid material upwardly in the spaces between the partitions and the ends of the surfacing plates. Then the conveyer is again advanced and the mold is again filled with stone making material in moist condition, which may comprise cement and sand with enough liquid added to moisten the mass. Then the cross piece bearing the partitions is removed and the mold advanced by the conveyer to position directly over the second pressing device. Then the machinery for lowering the presser plates is set in motion and the final compression of the material is made by the presser plates. Then the mold is advanced to the device for separating the molds from the surfacing plates and finished stones and the operator first moves the presser plates downwardly into firm contact with the finished stones and then manipulates the lever for raising the mold. Then the off-bearing plate with the surfacing plates and stones is advanced by the conveyer and carried away to be dried.

It is of great importance in an apparatus of this kind that the surfacing plates are not shaken or jarred loose at any point from the stones. By my improved apparatus the material is molded upon the surfacing plates while they rest upon the off-bearing plate and it is not necessary for the operator to touch either the stones or the surfacing plates until after the stones have thoroughly dried and hardened. By removing the mold from the stones, the sides and tops of the stones will be exposed to the air so that they will dry first while the drying and crystallizing and hardening process on the surfaces of the stones adjacent to the surfacing plates will be slower and I have found that this tends to permit these surfaces of the stones to thoroughly crystallize and present a smooth and glossy appearance free from pores or interstices that might tend to absorb moisture. By having the surfaces of the surfacing plates made smooth, non-absorbent and moisture-repellent, I have found that if the stones have dried and hardened in unbroken contact with said surfaces, the stones will be smooth and crystallized and present a glossy appearance and after such hardening and crystallization, the surfacing plates may be removed and when so removed will be perfectly clean and free from any of the material of which the stones were formed. By having said surfacing plates made non-erosive they will remain in their smooth, clean and moisture-repellent condition after repeated use. By having the surfacing plates formed with a bottom and a side member made of one piece, there will be no cracks or rough surfaces at the corners of the finished stone, such as would be caused if two independent plates were used for this purpose. By having the margins of the surfacing plates projected upwardly, as shown, the liquid material first introduced is retained wholly within said surfacing plates and hence the finished stone will present smooth, slightly rounded corners and will not be rough and uneven as would be the case if the top of the surface plate were flat.

Having thus described my invention, what I claim and desire to secure by Letters Patent of the United States, therefore is—

1. In an apparatus of the class described, a frame, a mold support thereon, two sliding bars on opposite sides of the frame above the mold support and manually operated means for jointly moving them to or from each other.

2. In an apparatus of the class described, the combination of a frame, bars extended through the frame to support a mold, a conveyer formed with fingers projecting upwardly above the bars to move a mold over the bars and through the frame and means for engaging the sides of the mold and accurately centering it within the frame.

3. In an apparatus of the class described, the combination of a frame, a mold support thereon, a series of connected presser plates above the mold support, a rotatable shaft, crank arms on the shaft, rods connecting the crank arms with the presser plates, a pulley rotatably mounted on the crank shaft and having a clutch member, a sliding non-rotatable clutch member on the shaft, means for moving said clutches into or out of engagement with each other and spring-actuated means for automatically elevating the presser plates when the clutch members are released.

4. In an apparatus of the class described, the combination of a frame, a mold support thereon, a series of connected presser plates above the mold support, a rotatable shaft, crank arms on the shaft, rods connecting the crank arms with the presser plates, a pulley rotatably mounted on the crank shaft and having a clutch member, a sliding non-rotatable clutch member on the shaft, manually-released spring-actuated means for throwing the sliding clutch member into engagement with the rotary clutch member and spring-actuated means for automatically elevating the presser plates when the clutch members are released.

5. In an apparatus of the class described, the combination of a frame, a mold support thereon, a series of connected presser plates above the mold support, a rotatable shaft, crank arms on the shaft, rods connecting the crank arms with the presser plates, a pulley rotatably mounted on the crank shaft and having a clutch member, a sliding non-rotatable clutch member on the shaft, manually-released, spring-actuated means for throwing the sliding clutch member into engagement with the rotary clutch member, means for automatically throwing the sliding clutch member out of engagement with the rotary clutch member and spring-actuated means for automatically elevating the presser plates when the clutch members are released.

6. In an apparatus of the class described, the combination of a frame, a mold support thereon, a rock shaft mounted in the frame, crank arms on the shaft, a presser plate, rods connecting the crank arms and presser plate, a rotatable pulley on the rock shaft formed with a clutch member, a sliding clutch member on the shaft formed with an annular groove and with a series of short spiral ribs adjacent to said groove, a spring for forcing the sliding clutch member toward the rotatable one, a pivoted arm yieldingly held toward the sliding clutch member and designed to enter the groove thereof or to engage the spiral ribs thereof, and means for manually withdrawing said arm from the clutch.

7. In an apparatus of the class described, the combination of a frame, a mold support thereon, a rock shaft mounted in the frame, crank arms on the shaft, a presser plate, rods connecting the crank arms and presser plate, a rotatable pulley on the rock shaft formed with a clutch member, a sliding clutch member on the shaft formed with an annular groove and with a series of short spiral ribs adjacent to said groove, a spring for forcing the sliding clutch member toward the rotatable one, a pivoted arm yieldingly held toward the sliding clutch member and designed to enter the groove thereof or to engage the spiral ribs thereof, means for manually withdrawing said arm from the clutch and a spring tending to rock the shaft in a direction to elevate the presser plate.

8. In an apparatus of the class described, the combination of a frame, mold supporting bars extended through the frame, rollers adjacent to the bars and parallel therewith and having their tops slightly above the bars to engage and support a mold while within the said frame and to permit said mold to move freely in a direction across the tops of the rollers.

9. In an apparatus of the class described, the combination of a frame, mold supporting bars extended through the frame, rollers adjacent to the bars and parallel therewith and having their tops slightly above the bars to engage and support a mold while within the said frame and to permit said mold to move freely in a direction across the tops of the rollers and a mold centering device.

10. In an apparatus of the class described, a surfacing plate made of a single piece of material and comprising a bottom having upturned margins and a side piece having margins projecting inwardly over the upturned bottom.

11. In an apparatus of the class described, the combination of a mold and a detachable swinging partition supported initially in an inclined position near one end of the mold and spaced apart from the bottom of the mold.

12. In an apparatus of the class described, the combination of a mold, a surfacing plate having a bottom and a side resting in the mold and a detachable partition yieldingly supported adjacent to the side of the surfacing plate and spaced apart from the bottom of the surfacing plate.

13. In an apparatus of the class described, the combination of a mold, a cross piece resting on top of the mold, arms on the cross piece to engage a portion on the exterior of the mold to support the cross piece, and a partition fixed to the cross piece to project downwardly into the mold with its lower end spaced apart from the bottom of the mold and movable with a swinging motion toward an end of the mold.

14. In an apparatus of the class described, the combination of a mold and a yieldingly, detachable partition normally standing with its top near one end of the mold and its body portion extended downwardly and toward the center of the mold to a point spaced apart from the bottom of the mold and capable of being moved by pressure within the interior of the mold to a substantially upright position.

15. In an apparatus of the class described, a mold formed of sides and ends with the sides projecting beyond the ends, a detachable cross piece on top of the mold, arms extended downwardly and laterally to engage the projecting ends of one side of the mold and a spring metal partition fixed to the cross piece and extended downwardly and toward the center of the mold away from the side of the mold that is engaged by said arms.

16. In an apparatus of the class described, the combination of a frame, a series of presser plates connected with each other and vertically movable within the frame, a pair of centering bars having beveled lower ends connected with the presser plates, a mold support within the frame, a mold therein having partitions arranged to be engaged by said centering bars when the presser plates are lowered toward the mold.

17. In an apparatus of the class described, the combination of a frame, a series of presser plates connected with each other and vertically movable within the frame, a pair of centering bars having beveled lower ends connected with the presser plates, a mold support within the frame, a mold therein having partitions arranged to be engaged by said centering bars when the presser plates are lowered toward the mold, said mold support including rollers for permitting longitudinal movement of the mold.

18. In an apparatus for making artificial stone comprising a conveyer, for supporting and advancing molds, one or more frames, each having said conveyer passed through it and each having a presser plate capable of up and down movement to and from the conveyer and a frame also having said conveyer passed through it and a presser plate capable of up and down movement toward the conveyer and a mold elevating device capable of independent up and down movement.

19. In an apparatus of the class described, the combination of three frames, two angle bars extended longitudinally through said frame, conveyer chains supported by the angle bars and having fingers to project upwardly above them, an off-bearing plate resting on the angle bars to be engaged by said fingers, an open bottomed mold on top of the off-bearing plate, a presser plate in the first frame, means for vertically moving it to compress material within the mold, a similar presser plate within the second frame, a similar presser plate within the third frame and means for elevating the mold from the off-bearing plate while the presser plate is still in engagement with the material resting on the off-bearing plate.

20. In an apparatus of the class described, the combination of a mold including the mold sides and a mold body, a flexible surfacing plate detachably mounted in the mold and resting upon said bottom, means for applying pressure to stone making material in the mold to hold it firmly against said surfacing plate, and means for separating the mold sides from the stone making material and the surfacing plate and the mold bottom without breaking contact between the stone making material and the surfacing plate, and without removing the pressure therefrom.

Des Moines, Iowa, May 5, 1906.

FRANK R. STEHM.

Witnesses:
J. RALPH ORWIG,
S. F. CHRISTY.